UNITED STATES PATENT OFFICE.

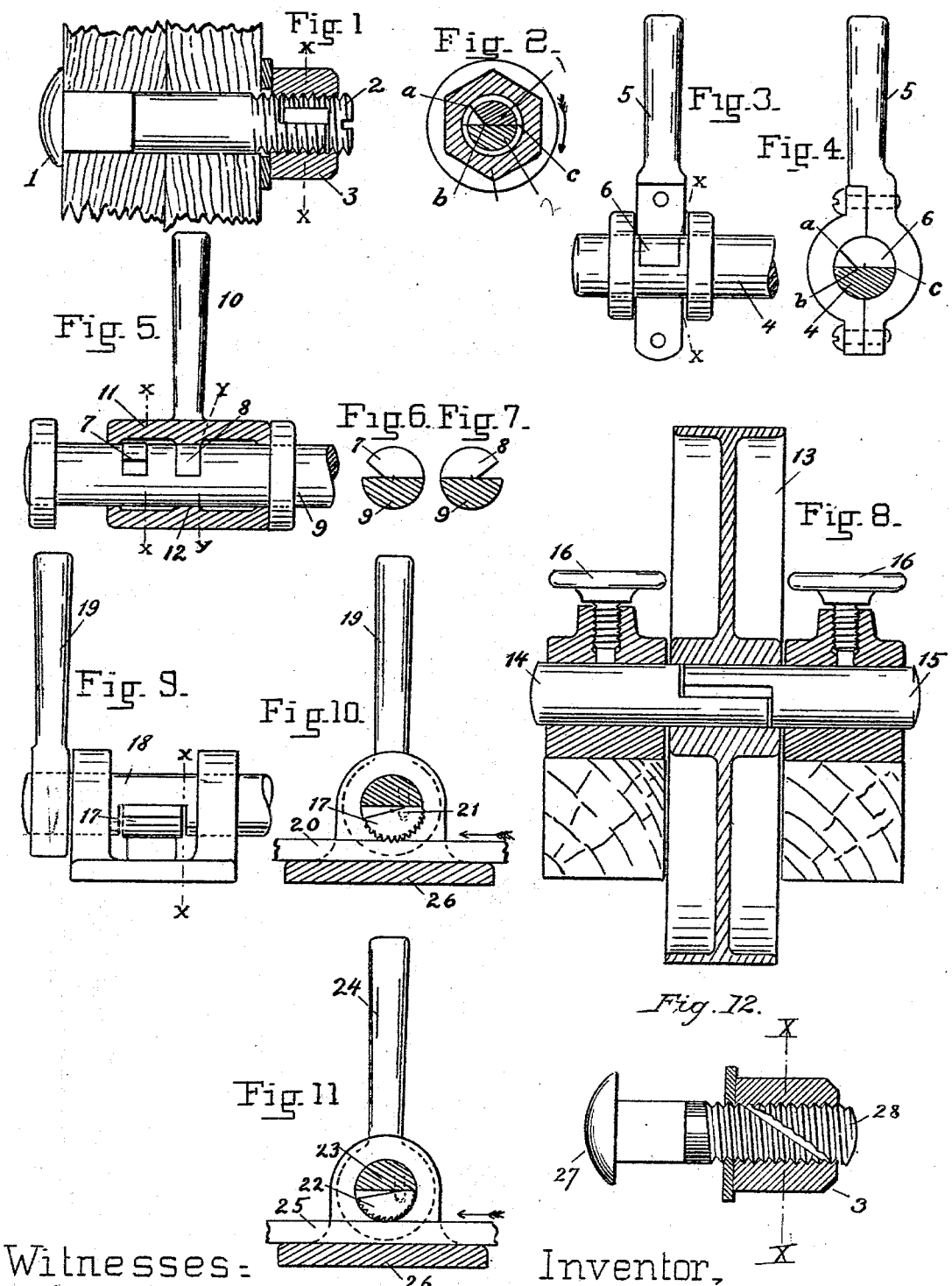

EDWIN STANCLIFF, OF NEW YORK, N. Y.

FRICTION GRIP MECHANISM.

SPECIFICATION forming part of Letters Patent No. 514,571, dated February 13, 1894.

Application filed November 1, 1893. Serial No. 489,700. (No model.)

*To all whom it may concern:*

Be it known that I, EDWIN STANCLIFF, a citizen of the United States of America, residing at the city of New York, county and State of New York, have invented certain new and useful Improvements in Friction Grip Mechanism, of which the following is a specification.

My invention consists essentially of a shaft split on a plane that lies in the general direction of the length of the shaft, with the two parts laid together so as to make the shaft complete, one part being beveled along one side by cutting away a portion of the face, that contacts with the other part in such manner as to form a longitudinal rocking edge so positioned that if the parts are rocked relatively to each other upon this edge in one direction their joint diameter is increased beyond their joint diameter when the parts are rocked in the other direction.

My invention is applicable in various devices. I show in this specification three widely different devices in order to illustrate its scope. But I do not limit my broader claims to the devices shown.

Referring to the accompanying drawings which form a part of this specification, Figure 1 is a side view of a carriage bolt with the nut in section, showing my invention applied to nut-locks. Fig. 2 is a section through the nut on the line $x$ of Fig. 1. Fig. 3 is a side elevation showing my invention applied to ratchets. Fig. 4 is a section on the line $x$ of Fig. 3. Fig. 5 is a side elevation partly in section showing my invention applied in a reversible ratchet. Figs. 6 and 7 are sections on the lines $x$ and $y$ respectively of Fig. 5. Fig. 8 is a vertical section of a pully shaft and wheel and pillow blocks showing my invention embodied in a reversible clutch applied to the pulley wheel. Fig. 9 is a side elevation showing my invention applied as a feeding device. Fig. 10 is a section on the line $x$ of Fig. 9. Fig. 11 shows a modification of the device shown in Figs. 9 and 10, the illustration being a sectional view similar to Fig. 10. Fig. 12 shows a modification of the device of Fig. 1.

Referring now to the nut-lock of Figs. 1 and 2, the bolt is in two parts. Part 1 carries the head and a portion of the thread of the bolt, and part 2 carries the remainder of the thread of the bolt. A portion of the surface of separation of the two parts is, as shown, parallel to the longitudinal axis of the bolt. The bolt may be severed along its entire length. But this is not necessary, and the form which I have shown has certain advantages which will be hereinafter set forth. The surface of separation of the two parts is represented in Fig. 2 by a broken line. The separation of the parts of the bolt represented by this line is effected by making two transverse cuts preferably started from opposite sides of the bolt, and near the opposite ends of the thread, and connecting them by a longitudinal cut through the body of the bolt, which cut also extends entirely across the bolt from side to side. There is thus formed upon each part a plane surface which extends clear across the bolt. These two plane faces are of course equal. Then from one of the parts, part 2 as shown, a longitudinal wedge is cut by beveling the part along one side. Except as explained hereinafter in connection with Fig. 11, this bevel preferably in no case cuts away more than half of the flat face of part 2 formed by the longitudinal cut through the body of the bolt above referred to, and in the single case where the longitudinal cut through the body of the bolt lies, as shown, in the same plane with the central axis of the bolt, less than half of the said flat face must be cut away. For if exactly half is cut away the rocking edge will then coincide with the central axis of the bolt, and the diameter of the bolt will not be altered by rocking the parts on this edge. And if more than half be cut away the device becomes substantially like that of Fig. 11, from the discussion of which below it will appear that the bolt if so cut could not operate to lock the nut. When the nut 3 is turned in the direction of the arrows shown in Fig. 2, (which, with a right handed screw, is the direction that carries the nut onto the bolt,) the friction of the nut in the thread tends to hold the face $b\ c$ down on the flat face of the part 1 and the nut turns onto the bolt as though the bolt were not split. But when the nut is turned in the opposite direction to take it off, the friction of the nut tends to turn the part 2 on the rocking edge $b$ thereby increasing the diameter of the bolt and causing the nut to bind. If it is desired to get the nut off it is only necessary to hold the part 2 so that it shall not rock onto the rocking edge b. This may be effected in numerous ways and I show a slot in the outer end of the part 2 into which a tool like a screw driver can be inserted to hold the part 2 with its face b c in contact with the flat face of the part 1 while the nut is being turned off. Of course if dirt were to get in between the parts 1 and 2 so as to prevent the part 2 from rocking as above indicated it might prevent the device from acting as a nut-lock. For that reason it is desirable to have the nut cover one or two threads of the part 2 beyond the end of the part 1 and one or two threads of the part 1 within the end of the part 2 so that the surface of separation between the two parts will lie wholly within the nut 3 when the bolt and nut are in place in the structure in which they are to be used. It is not strictly necessary that the two parts should be separated on an exactly longitudinal plane. All that is necessary is that a portion of the surface of separation shall have a longitudinal component. They might for instance be separated along a diagonal plane. This form is illustrated in Fig. 12. The bolt 27 is split on a diagonal. The part 28 is beveled in such a manner as to form a rocking edge, which lies in a longitudinal plane through the bolt. A section through the middle of this diagonal cut, on the line x—x of Fig. 12, presents the appearance of Fig. 2.

I do not claim my invention as applied to nut-locks specifically in this application since it is claimed in my pending application, Serial No. 480,683, filed July 17, 1893, for an improvement in nut locking bolts, but I show the nut-lock in this application to illustrate the scope of my invention, and intend in my broader claims to cover it together with other allied devices.

The thread of the bolt and nut shown in Figs. 1 and 2, is not necessary to the operation of my invention since the friction between an unthreaded shaft and collar can be made sufficient to rock a part like the part 2 in the manner before described, and I have shown, in Figs. 3 and 4, a ratchet device which embodies my invention. In this device the shaft 4, which is revolved in one direction by the handle 5, but upon which the handle slips freely when turned in the other direction, has a prismatic section cut out of it. As is clearly shown this section is cut out by making two transverse cuts started from the same side of the shaft and connecting them by a longitudinal cut through the body of the shaft. The piece 6 thus cut out is beveled as shown in Fig. 4 in the same manner as part 2 of Figs. 1 and 2 is beveled. This bevel as is seen cuts away less than half of the flat face of the part 6 formed by the longitudinal cut through the body of the shaft above referred to. The handle 5 will turn freely to the left in Fig. 4, the parts then occupying the position shown in the figure and their joint diameter within the collar being the normal diameter of the shaft, but when turned to the right rocks the part 6 onto to its rocking edge and thereby increases the diameter of the shaft beyond its normal diameter and causes it to bind. This device therefore acts as a ratchet which will catch at any point.

In Figs. 5, 6 and 7, I have illustrated a reversible ratchet. This is identical with that shown in Figs. 3 and 4, except that there are two rocking pieces 7 and 8 set in shaft 9 instead of one, which are beveled from opposite sides as shown in Figs. 6 and 7. The handle carries a shield 11 which has a rim 12 that contacts with the rocking pieces 7 or 8 according to how the handle is set. If set so that the rim 12 contacts with the piece 7, which piece is shown in section in Fig. 6, the handle will turn freely to the right but is locked when turned to the left, and if set so that the rim 12 contacts with the piece 8, which piece is shown in section in Fig. 7, the handle will turn freely to the left but locks when turned to the right.

It will be obvious from any one of the foregoing figures that the device will act as a grip whether the beveled piece be made to rock on the other part of the shaft or vice versa. If (Figs. 1 and 2) part 2 is held the nut will turn off freely but will not turn on, whereas if the part 1 is held the nut will turn on freely but will not turn off. For, in the latter case, if a bolt similar to that shown in Figs. 1 and 2 be held by the outer end of the part 2, part 1 being free to rock, the nut, when it is turned on, will carry the part 1 with it in the direction of the arrow in Fig. 2 which will cause it to rock on to the rocking edge b and cause the nut to bind.

I have shown in Fig. 8 an application of the principle set forth in the last paragraph in form of a reversible clutch pulley wheel. It is also applicable to the axle of a car or wagon. As shown the pulley wheel 13 is mounted on a shaft made up of two parts 14 and 15 which are separated by a division line in the same manner as the parts 1 and 2 of Fig. 1 are separated. One of these parts 15 has a wedge shaped piece cut out of it like that cut out of part 2 of Fig. 1. Either part 14, or 15 may be rocked upon the edge thus formed and if either is so rocked the joint diameter is increased beyond the normal diameter of the shaft and the shaft binds the pulley wheel. The two parts 14 and 15 are mounted in pillow blocks, and screws 16 are provided whereby either or both of the parts 14 and 15 can be clamped. If part 14 be clamped and the part 15 free to rock the pulley wheel 13 can, in Fig. 8, turn freely in the direction of motion of the hands of a watch held in the plane of the wheel with its top toward the top of the sheet and its face toward the right hand side of the sheet. But if the wheel be turned in the opposite direction to the motion of the hands of a watch so placed the part 15 will be rocked onto its rocking edge and bind the wheel. If the part 14 be unclamped and the part 15 clamped then the pulley wheel can turn freely in the opposite direction to the motion of the hands of a watch placed as above but would be locked against turning in the same direction as the motion of the hands. If both parts 14 and 15 be clamped with the two parts positioned to give the shaft its normal diameter within the hub of the pulley wheel, the pulley wheel will turn freely in either direction.

The devices shown in Figs. 3 to 8 inclusive have the feature already explained with respect to the nutlock of Figs. 1 and 2 viz. that the entire surface of separation between the two parts of the shaft lies within the encircling collar since the length of the split is less than the width of the collar. Thus the collar covers the longitudinal gap formed between the two parts by the bevel and no dirt can get in to prevent the parts rocking on the rocking edge formed by the bevel.

It is obvious that my invention may be applied in devices in which there is no ring encircling the shaft since one part of the shaft can be rocked upon another part by contact with a flat surface.

In Figs. 9, 10 and 11, I have shown my invention applied to a feeding device, the friction necessary to rock the part being obtained by pressure upon a flat surface.

In Figs. 9 and 10 the construction and operation is substantially the same as in devices in Figs. 1 to 8 inclusive. The part 17, which is a prismatic section of shaft 18, similar to the part 8 set in shaft 9, is beveled in the same manner as the part 8 is beveled.

In Fig. 10 the part 17 is shown as rocked by friction upon its beveled edge and in fact is actually shown as rocked over so far as to bring the short face in contact with the flat contacting face of the part 18. This makes the diameter of the shaft greater than the normal diameter and gives the gripping effect desired. It is effected by moving the handle 19 to the right in Fig. 10, whereby the material 20 is moved upon the supporting plate 26 to the left, as indicated by the arrow. The two parts 17 and 18 are held together by a dowel-pin 21 indicated by the dotted lines in Fig. 10.

Fig. 11 is very similar in appearance to Fig. 10, but shows a modification of the device of Fig. 10 which requires explanation. It will be clear from the foregoing discussion that the increase in diameter of the shaft in any one of the devices shown in Figs. 1 to 10 which occurs on rocking one part of the shaft upon the other on the rocking edge provided by beveling one part results only from the fact that the bevel cuts away less than half of the flat contacting face of the part beveled, all the parts being shown as split on a plane which includes the central axis of the bolt or shaft. If for instance in Fig. 6 the notch formed by beveling the part 7 were cut into the point which indicates the center of the circle that bounds the shaft, so that the sides of the cut were radii of the shaft, the diameter of the shaft would not be affected by rocking one part on the other; if the bevel were carried still farther in so that it reached from the point where in Fig. 6 it is shown to start at the rim of the shaft beyond the point which marks the center of the shaft and the upper part were then rocked on the rocking edge thereby formed the diameter would be less than when it was so rocked and hence less than the normal diameter of the shaft, as above explained. In this latter case, to adopt the phraseology before adopted, the bevel is formed by cutting away more than half the contacting face of the upper part of the shaft shown in Fig. 6. In Fig. 11 the bevel cut in the lower part 22 cuts away more than half of the flat contacting face of this part, so that when it is rocked on the part 23 by moving the handle 24 to the right the part 22 will rock into such position as to give to the two parts together a diameter equal to the normal diameter of the shaft, (which is the position shown) and when the handle is turned to the left the part 22 will rock so as to give to the two parts together a diameter less than the normal diameter of the shaft. The material 25 can thus be fed forward by moving the handle 24 backward and forward very neatly, the circumference of the parts 22 and 23 when gripping being circular, and the two parts turning on an axis through the center of the circle. The two parts 22 and 23 are fastened together by dowel-pins as in Fig. 10 and in both Figs. 10 and 11 the lower part is provided with teeth to give a better hold, and the device is provided with a suitable framework as shown.

Without limiting myself to the precise details shown, what I claim, and desire to secure by Letters Patent of the United States, is—

1. In friction grip mechanism a shaft split on a plane that lies in the general direction of the length of the shaft, the two parts being laid together so as to make the shaft complete, one of the parts being beveled along one side by cutting away a portion of the face that contacts with the other part in such manner as to form a longitudinal rocking edge so positioned that if the parts are rocked relatively to each other upon this edge in one direction their joint diameter is increased beyond their joint diameter when the parts are rocked in the other direction substantially as described.

2. In friction grip mechanism a shaft split on a plane that lies in the general direction of the length of the shaft, the two parts being laid together so as to make the shaft complete, one of the parts being beveled along one side by cutting away a portion of the face that contacts with the other part, in such manner as to form a longitudinal rocking edge so positioned that if the parts are rocked relatively to each other upon this edge in one direction their joint diameter is increased beyond the normal diameter, substantially as described.

3. In friction grip mechanism a shaft split on a plane that lies in the general direction of the length of the shaft, the two parts being laid together so as to make the shaft complete, one of the parts being beveled along one side by cutting away a portion of the face that contacts with the other part, in such manner as to form a longitudinal rocking edge so positioned that if the parts are rocked relatively to each other upon this edge in one direction their joint diameter is increased beyond the normal diameter, in combination with a collar encircling the two parts of the shaft and gripped thereby to prevent its turning freely in one direction upon the shaft, substantially as described.

4. In friction grip mechanism a shaft split on a plane that lies in the general direction of the length of the shaft, the two parts being laid together so as to make the shaft complete, one of the parts being beveled along one side by cutting away a portion of the face that contacts with the other part, in such manner as to form a longitudinal rocking edge so positioned that if the parts are rocked relatively to each other upon this edge in one direction their joint diameter is increased beyond the normal diameter, in combination with a collar encircling the two parts of the shaft and gripped thereby to prevent its turning freely in one direction upon the shaft, the length of the split being less than the width of the collar, substantially as described.

5. In friction grip mechanism a shaft split in the general direction of its length, the two parts being laid together so as to make the shaft complete, one of the parts being beveled along one side by cutting away a portion of the face that contacts with the other part, in such manner as to form a longitudinal rocking edge so positioned that if the parts are rocked relatively to each other on this edge in one direction their joint diameter is increased beyond the normal diameter, in combination with a collar encircling the two parts of the shaft and gripped thereby to prevent its turning freely in one direction upon the shaft, and means for holding either or both of these parts substantially as described.

6. In friction grip mechanism a shaft split on a plane that lies in the general direction of the length of the shaft, the two parts being laid together so as to make the shaft complete, one of the parts being beveled along one side by cutting away a portion of the face that contacts with the other part, in such manner as to form a longitudinal rocking edge so positioned that if the parts are rocked relatively to each other upon this edge in one direction their joint diameter is increased beyond the normal diameter, in combination with a collar encircling the two parts of the shaft and gripped thereby to prevent its turning freely in one direction upon the shaft and means for holding either or both of these parts, substantially as described.

Signed by me, in New York city, this 31st day of October, 1893.

EDWIN STANCLIFF.

In presence of—
THOMAS EWING, Jr.,
HY H. WHITMAN.